Oct. 9, 1934.    T. G. CASTNER    1,976,481
WAVE ANALYSIS
Filed Aug. 20, 1931
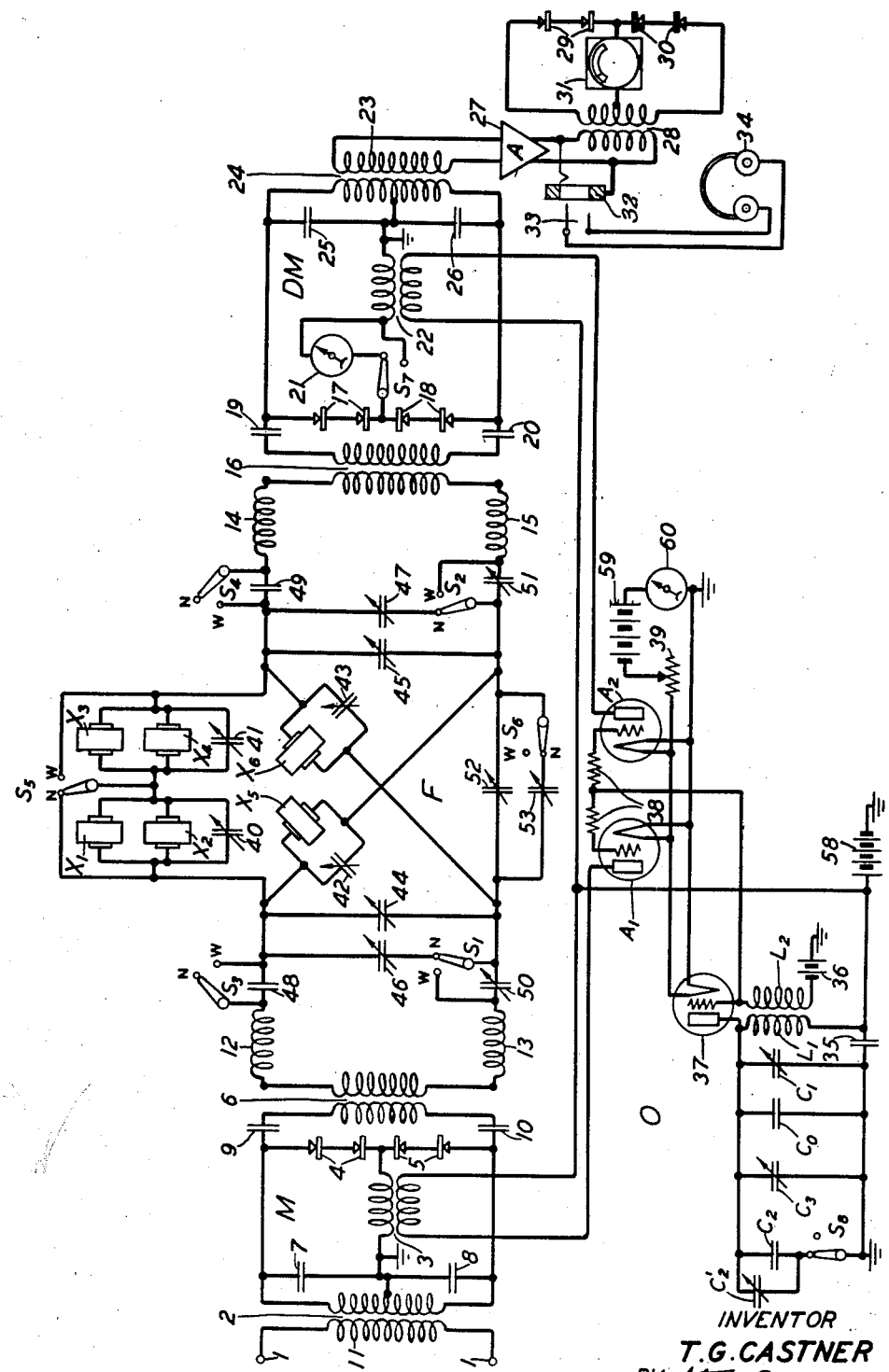
INVENTOR
T.G. CASTNER
BY J.T.A. Burgess
ATTORNEY Patented Oct. 9, 1934

1,976,481

UNITED STATES PATENT OFFICE 1,976,481

WAVE ANALYSIS

Theodore G. Castner, East Orange, N. J., assignor to Bell Telephone Laboratories, Incorporated, New York, N. Y., a corporation of New York Application August 20, 1931, Serial No. 558,196

7 Claims. (Cl. 175—183)

This invention relates to electrical measuring instruments and more particularly to instruments for analyzing complex waves.

An object of this invention is to increase the sensitivity, accuracy and flexibility of a complex wave analyzer.

Another and more particular object of the invention as applied to the analysis of audio frequency waves is to give the observer an audible indication of the frequency component under measurement.

Wave analyzers have been proposed heretofore in which the complex wave to be examined is heterodyned with a wave of adjustable frequency and applied to a selective network. By properly selecting the frequency of the heterodyning wave any desired frequency component of the complex wave can be passed through the network and its amplitude then measured with a suitable meter. In this type of analyzer difficulty is experienced in preventing the heterodyning wave from affecting the meter, especially when components of low frequencies are being measured. The wave resulting from the combination of a low frequency wave and the heterodyne wave differs in frequency but little from the latter wave. Regardless of the system of modulation used, it is found, the amplitude of the heterodyne wave leaking through or around the selective network is almost invariably sufficient to make the selection and measurement of these components close to the carrier frequency extremely difficult.

In accordance with applicant's invention frequency translating means are provided in a wave analyzer of the heterodyne type to restore the components passed by the selective circuit thereof to their original frequencies before applying them to the meter or other indicating device. The restoration of the selected component waves to their original frequencies makes possible the selection and measurement of components of considerably lower frequencies than is possible when the component high frequency waves are applied directly to the meter. Any heterodyning current which leaks through or around the selective network is converted in the demodulating process into a direct current component, which is not passed by the succeeding amplifier and so contributes nothing to the meter reading. Such a combination is especially adapted to the analysis of complex electrical waves of audio frequency, such, for example, as speech and noise waves, and it may be used in combination with a suitable transducer for the analysis of acoustic waves.

Restoring the selected component waves to their original frequencies has the further advantage that it enables the operator to obtain an audible indication of the selected waves, as by means of a telephone receiver. Any uncertainty as to the nature of the waves applied to the meter can thereby be removed. Where the analysis is not in terms of the amplitude of single frequency components or of the energy content of bands, but is merely a qualitative one wherein the approximate composition of the complex wave is desired, the use of a telephone receiver makes possible a more detailed analysis than can be obtained with the meter. Since the ear is capable of recognizing a comparatively weak tone in the presence of a number of interfering tones, while the meter can only measure the total energy applied to it, the effect of greater filter selectivity is obtained by providing the audible indicator. The operation of the analyzer is simplified also, since the audible response enables the operator to locate readily components which are barely sufficient to affect the meter.

Other objects and features of the present invention will appear in the following description of a wave analyzer embodying the invention in specific form, reference being made to the single figure of the accompanying drawing.

In the drawing there is shown schematically the circuit of an instrument for making either a narrow band or a wide band analysis of complex waves. The operation of this circuit is roughly as follows: The unknown waves applied at terminals 1 are impressed in a modulator M on waves from an oscillator O. The frequency of the oscillator is then adjusted so that any particular component band of frequencies of the modulated waves is passed through the selective circuit F. In the succeeding demodulator DM the selected band is reduced to its original frequency position, whence it passes through an amplifier 27 and a rectifier to meter 31. A telephone receiver 34 may be plugged into the output of the amplifier 27 at will so that the operator may obtain an audible indication of the waves being measured. Switches are provided in the filter F whereby the latter may be readily controlled to pass either a narrow frequency band or a broad one.

The modulator circuit M is connected to terminals 1 through input transformer 2. It is preferably of the balanced type and in the embodiment shown comprises two oppositely poled groups 4, 5, of rectifying devices of the copper-oxide type connected across the secondary winding 11 of transformer 2. Between the junction of the two groups of rectifying devices and the mid-point of winding 11 is connected the secondary winding of transformer 3, the primary of which is connected to the variable frequency oscillator O. Condensers 7 and 8, shunting the secondary winding 11 of transformer 2, afford a low impedance path to waves of oscillator frequency and thereby eliminate any retroactive effects on the input circuit. The waves resulting from the modulation process are applied to the primary winding of transformer 6 through condensers 9 and 10, which prevent the low inductance of the latter winding from causing a high shunting effect on winding 11 at audio frequencies. They are thence passed through the transformer 6 to the input terminals of filter F.

Filter F is preferably of a type incorporating piezo-electric crystals, since this type affords the degree of selectivity desired, but other suitable types of selective circuits may be substituted therefor. The lattice type of filter shown is more fully described in an application of W. P. Mason bearing Serial No. 489,268, filed October 17, 1930. In the four terminal leads of the filter are connected the inductors 12, 13, 14 and 15, respectively. The cross-connected members comprise respectively a piezo-electric crystal $X_5$ shunted by a condenser 42 and a piezo-electric crystal $X_6$ shunted by a condenser 43. Permanently connected across the lattice are condensers 44 and 45. For a narrow band analysis switches $S_1$ and $S_2$ are placed on their respective contacts "N" to connect condenser 46 in parallel with condenser 44 and condenser 47 in parallel with condenser 45. Condensers 50 and 51 are connected in series with inductors 13 and 15, respectively. With switches $S_1$ and $S_2$ in their alternative positions for wide band anlysis, i. e., on contacts "W", these latter condensers are short-circuited. Condensers 48 and 49 are similarly connected in series with inductors 12 and 14 and may be short-circuited by switches $S_3$ and $S_4$, respectively, for wide band analysis. In the lower branch of the lattice is condenser 52, which is augmented by condenser 53 when switch $S_6$ is on its "N" contact. In the upper branch of the lattice either the group of parallel connected elements comprising piezo-electric crystals $X_1$ and $X_2$ and condenser 40 or the similar group comprising piezo-electric crystals $X_3$ and $X_4$ and condenser 41 are connected in circuit, depending on whether switch $S_5$ is on its "W" or on its "N" contact. The particular values of the various filter elements will depend on the frequency for which it is designed and on the respective widths of the narrow and wide frequency bands. In an analyzer where a mean band frequency of 40,000 cycles was employed and the band widths were 30 and 450 cycles per second respectively, piezo-electric crystal $X_1$ had a resonant frequency of 39,795 cycles per second, crystal $X_2$ had a frequency of 40,194 cycles per second, crystal $X_3$, 39,971 cycles per second, crystal $X_4$, 40,006 cycles per second and crystals $X_5$ and $X_6$, each, 39,997 cycles per second. The inductors 12, 13, 14 and 15 each had an inductance of 7.25 millihenries and the condensers were of the following capacities: condenser 40, 91 mmf.; condenser 41, 37 mmf.; condensers 44 and 45, each 977 mmf.; condensers 46 and 47, each 1600 mmf.; condenser 52, 115 mmf.; condenser 53, 160 mmf., and condensers 48, 49, 50 and 51, each 4000 mmf.

The output terminals of filter F are connected to the primary winding of transformer 16. The secondary winding of this transformer is connected through condensers 19 and 20 across the oppositely poled groups 17, 18 of rectifying elements, which may be of the same type as those in the modulator circuit. The balanced primary winding of output transformer 24 is also connected across the rectifiers. Between the midpoint of this winding and the junction of the rectifier groups is introduced the secondary winding of transformer 22, which supplies the demodulating wave from oscillator O. A meter 21 may be connected in series with this secondary winding by means of switch $S_7$. Condensers 25 and 26 serve to by-pass the high frequency waves present. Amplifier 27 to which transformer 24 is connected, may be of any suitable type. To its output terminals is connected an indicating and measuring circuit shortly to be described.

Oscillator O is adapted to supply to modulator M and to demodulator DM waves ranging in frequency from 40 to 50 kilocycles per second. Preferably, the frequency of the oscillator is variable over two ranges, one from 40 to 43.5 kilocycles per second, the other from 40.0 to 50 kilocycles per second. A switch $S_8$ is provided to change the constants of the oscillatory circuit for this purpose. With switch $S_8$ closed, the chief elements of the oscillatory circuit are an inductor $L_1$, a fixed condenser $C_0$ of 0.001 mmf. capacity, a fixed condenser $C_2$ of 0.001 mmf. capacity and a variable condenser $C_1$ of 0.001 mmf. maximum capacity. Blocking condenser 35, which may be of 1 microfarad capacity prevents short-circuiting of the battery 58, which supplies space current to the discharge device 37 through inductor $L_1$. The frequency of the oscillatory circuit just defined may be varied from 40 to 43.5 kilocycles per second. By opening switch $S_8$, thereby removing condenser $C_2$, the range of frequencies between 43.5 and 50 kilocycles may be covered. The variable condenser $C_1$ may be calibrated to indicate directly the frequency of the component passed by the filter and indicated by meter 31. Two scales are provided for this purpose, one for each position of switch $S_8$. The small variable condenser $C^3$ may be adjusted to correct for any minor departure of the zero point of the instrument. Condenser $C_2'$ may likewise be used to correct for small variations in condenser $C_2$. The grid circuit of the oscillator includes a coil $L_2$ inductively coupled with coil $L_1$ and a grounded biasing battery 36 connected thereto.

The modulator and demodulator circuits M and DM, respectively, are connected to oscillator O through individual three-element space discharge devices $A_1$ and $A_2$ respectively. By using separate amplifiers the tendency of waves in the modulator circuit to be shunted around filter F, which would be present were transformers 3 and 22, respectively, connected directly to the oscillator, is reduced. The resistance 38 connected between the grid of the oscillator and the grids of discharge devices $A_1$ and $A_2$ aid in this isolation of modulator and demodulator circuits. A meter 60 and rheostat 39 are provided in the common filament circuit of the discharge devices so that the filament current may be maintained at any predetermined value.

The measuring circuit to which the output of amplifier 27 is connected comprises preferably a full wave rectifier and a direct current meter, although any other suitable type of indicating or measuring apparatus may be employed. The circuit shown in the drawing includes the transformer 28, two oppositely poled groups 29, 30, of copper-oxide rectifier elements, and a direct current milliammeter 31. The telephone receiver 34 may be connected across the output terminals of amplifier 27 at will by inserting plug 33 in jack 32.

The primary calibration of the measuring apparatus can be made by applying waves of known amplitudes to the input terminals 1. Condenser $C_3$ of the oscillator is adjusted immediately before the analyzer is to be used so that with switch $S_8$ closed, condenser $C_1$ at its zero position, and no input applied to terminals 1, meter 21 indicates that waves of oscillator frequency are being passed by the filter. The presence of these waves is due to the unbalance in the modulator circuit that is almost invariably present. After closing switch $S_8$, condenser $C_2'$ is adjusted so that with a 3500 cycle wave applied to the input terminals 1 maximum response is again obtained.

The operation of the analyzer is as follows: For the analysis of waves in the lower portion of the audio frequency band, that is, between zero and 3500 cycles per second, switch $S_8$ is closed and switches $S_1$ to $S_5$ are placed on their "N" contacts. Condenser $C_1$ is then adjusted to successive positions and the response of meter 31 at each frequency interval is noted. For waves lying between 3500 and 10,000 cycles per second, switch $S_8$ is opened and the process repeated. Telephone receiver 34 may be plugged into the output circuit of amplifier 27 to yield an audible indication of the waves applied to the meter circuit, as stated hereinbefore. If only an approximate analysis is desired, switches $S_1$ to $S_5$ are placed on their "W" contacts and the frequency of the oscillator varied as before. The energy level of a band of waves 450 cycles wide centering about the frequency indicated by the scale of condenser $C_1$ is then given by meter 31. In many cases, especially in the measurement of noise, this broad band analysis is the only practical one to use.

While a specific embodiment of applicant's invention has been described for purposes of illustration, other embodiments and modifications are within the scope of the invention as defined in the appended claims.

What is claimed is:

1. In combination, a source of complex waves to be analyzed, means for effecting a frequency translation of said waves comprising a source of waves of adjustable frequency and modulating means for combining said complex waves and said waves of adjustable frequency, a band-pass filter for selecting a narrow band from said complex waves as translated in frequency, demodulating means for restoring said selected waves to their original frequencies comprising means for combining said selected waves with waves from said source of adjustable frequency, and an indicating device responsive to said selected waves as restored in frequency.

2. A combination for determining the frequency composition of complex audio-frequency waves comprising adjustable frequency translating means, means to apply said waves to said frequency translating means, means to select a fractional portion of the band of said complex waves as translated in frequency, means to translate said selected waves to their original audio frequency, and means to produce an audible indication of said selected waves.

3. An instrument for examining complex waves comprising means to translate said waves to a higher frequency position, means for selecting a component band of said complex waves as translated in frequency, means to restore said selected band of waves to its original frequency position, measuring means responsive to the energy level of waves from said last mentioned means, and means yielding an audible indication of said last mentioned waves.

4. In an instrument for analyzing complex electrical waves, means including a balanced modulator and a source of carrier waves for effecting a frequency translation of said complex waves, a piezo-electric filter adapted to transmit a narrow frequency band of said translated waves, means including a balanced demodulator and a second source of carrier waves for translating the waves transmitted by said filter in a sense opposite to that of said first frequency translation, and a measuring device responsive to the translated waves from said last mentioned frequency translating means, said second frequency translation obviating the otherwise vitiating effect of waves from said first mentioned source on the indication of said measuring device.

5. The method of analyzing a complex wave which comprises translating said complex wave to a new frequency position, selecting a desired component frequency or fractional component band of frequencies of said translated wave, restoring said selected component to its original frequency position, and obtaining an indication from said restored component.

6. In a complex wave analyzer comprising continuously variable frequency translating means and selecting means adapted to pass substantially only a single frequency, the method of determining the amplitude of a given, substantially single frequency component of a complex wave which comprises adjusting the frequency position of said given component to said frequency of said selecting means, selecting said given component, restoring the selected component passed by said selecting means to its original frequency position and measuring the amplitude of said restored component.

7. A wave analyzing apparatus comprising means for effecting a frequency translation of the band of waves to be analyzed, means for selecting a component narrow band of said translated waves, frequency translating means for restoring said selected band of waves to its original frequency position, and a measuring device responsive to said band of waves of restored frequency position.

THEODORE G. CASTNER.